Nov. 2, 1965    G. J. HOLTZ    3,215,096
COLLAPSIBLE SERVING CART
Filed Aug. 17, 1962    2 Sheets-Sheet 1

INVENTOR
GILBERT J. HOLTZ
BY Darby+Darby
ATTORNEYS

Nov. 2, 1965  G. J. HOLTZ  3,215,096
COLLAPSIBLE SERVING CART
Filed Aug. 17, 1962  2 Sheets-Sheet 2

INVENTOR
GILBERT J. HOLTZ
BY Darby & Darby
ATTORNEY

United States Patent Office 3,215,096
Patented Nov. 2, 1965

3,215,096
COLLAPSIBLE SERVING CART
Gilbert J. Holtz, Yonkers, N.Y., assignor to Belvedere Space Saving Products, Inc., Yonkers, N.Y., a corporation of New York
Filed Aug. 17, 1962, Ser. No. 217,645
1 Claim. (Cl. 108—111)

This invention involves an improved assembly of parts forming a portable serving cart which is easily collapsible for compact storage and, on the other hand, easily unfolded and locked for use.

One object of this invention is to provide a cart assembly of the above characteristics constructed of simple members which are used in pairs to form the complete cart.

Another object of the invention is to provide a cart of this type which is composed of relatively simple parts easily constructed by mass production methods and therefore relatively inexpensive to make.

Another object of this invention is to provide a cart of this general type having two table frames supported on main collapsible frame members to provide a double lever table wherein each table frame is an exact duplicate of the other thus minimizing manufacturing expense.

Another object of this invention is to provide a mobile serving cart of this general type which can be folded in substantially flat condition and locked therein and when ready for use unfolded by a simple reverse operation which includes locking the parts in unfolded position ready for use.

Other and more detailed objects of the invention will be apparent from the following disclosure of the embodiments thereof illustrated in full detail in the accompanying drawings.

Figure 1:
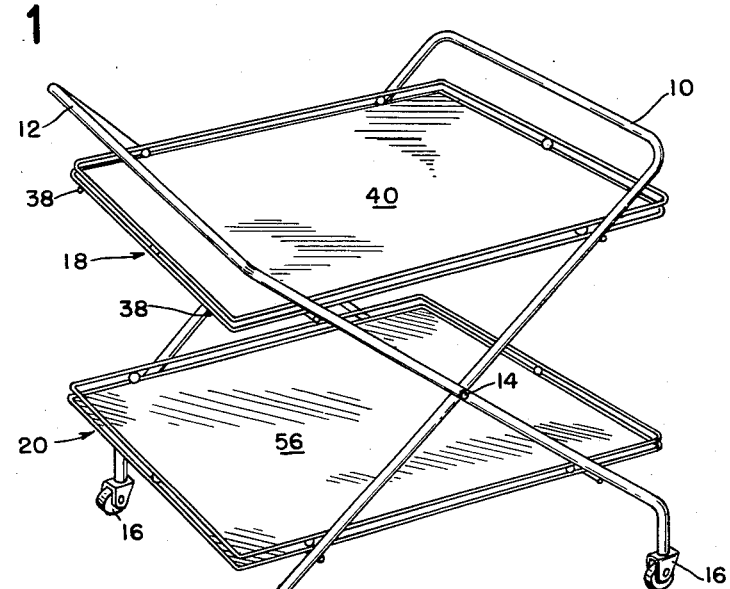
FIGURE 1 is a perspective view of a serving cart in accordance with this invention.

Structurally the cart assembly comprises a pair of U-shaped frame members 10 and 12 which have the terminal ends of the legs offset laterally and are provided with swivelled roller casters 16. These frame members are overlapped and pivotally interconnected intermediate their ends by means of pivot bolts 14. Preferably but not necessarily as shown, one main frame member is longer than the other as is clear from FIGURE 2 to provide for hand manipulation of the cart at a convenient level.

A pair of table frames are indicated generally by the reference characters 18 and 20. These table frames are supported by crossbars 22, 24, 26 and 28. These crossbars are arranged in pairs on the same levels and are connected to the frames 10 and 12 by welding them thereto as clearly indicated in the drawings. Swivelly mounted on the bracing rod 26 is a hook-shaped lock 30 which will be referred to later.

Figure 4:
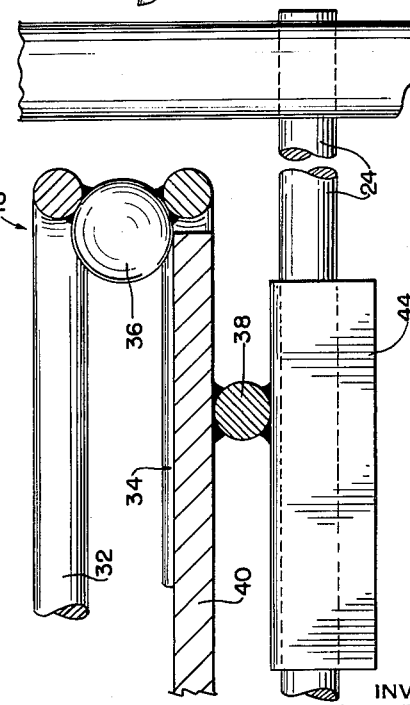
FIGURE 4 is an enlarged detail cross-sectional view taken on the line 4—4 of FIGURE 2.

The table frame 18 consists of a pair of rectangular frames 32 and 34 provided by bending metal rods into rectangular open frameworks and welding the abutting ends together. They are connected together in spaced parallel relationship by welding between them at uniformly spaced positions a series of metal balls 36 one of which is clearly illustrated in FIGURE 4. Extending longitudinally of this frame assembly are a pair of parallel rods 38 which are welded at their ends to the underside of the assembly, see particularly FIGURE 4. Welded to each of the rods towards each end thereof are U-shaped clips 42 and 44. Whereas the pair of clips 42 have parallel arms, the pair of clips 44 have converging arms. The converging arms are spaced so as to provide a forced frictional fit over the frame assembly cross brace 24.

The lower table frame 20 is similarly constructed comprising a pair of rectangular wire frames 48 and 50 corresponding to the frames 32 and 34. The frames 48 and 50 are united in parallel spaced relation by balls 52 welded therebetween similar to the construction shown in FIGURE 4. Likewise, as in the previous case, a pair of parallel rods 54 are welded to the underside of the frame assembly and have in turn welded to them the U-shaped clips 58 and 60. The legs of the clips 60 converge as in the case of the clips 44 to have a friction fit with the rod 28. Clips 58 are similar to the clips 42.

The table frames 18 and 20 are provided with bottoms consisting of suitably dimensioned sheets of material to form supporting surfaces. These sheets are shown at 40 and 56 respectively and can be of any suitable material such as plastic, fiber board, glass and the like. These sheets are dimensioned so that they can be locked in the table frames 18 and 20 by snapping them in place underneath the balls 36 and 52 respectively. It will be seen that these balls can be forced outwardly under pressure because of the flexibility of the wire frames to which they are welded thereby ensuring that the sheets will be securely locked in the frames.

The table assemblies 18 and 20 are pivotally supported on the rods 24 and 28 by springing the clips 40 and 60 thereover. These clips arem ade of spring material such as brass, for example, so as to form a firm connection with the rods and yet permit their detachment without much difficulty.

Figure 2:
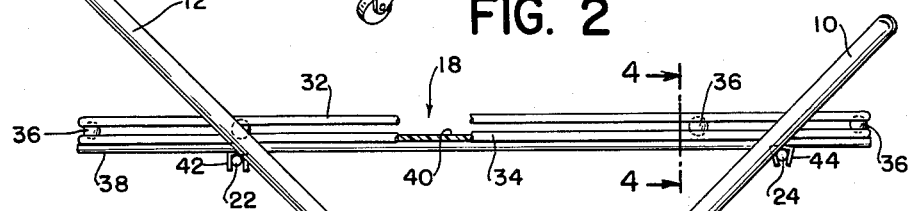
FIGURE 2 is an enlarged side elevational view of the cart with some parts omitted and some parts broken away for illustrative purposes.
Figure 2:
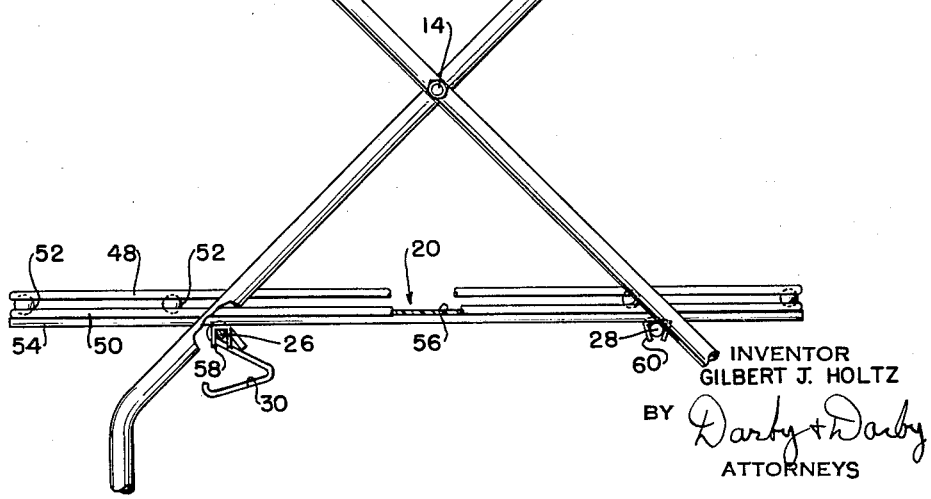
Figure 3:
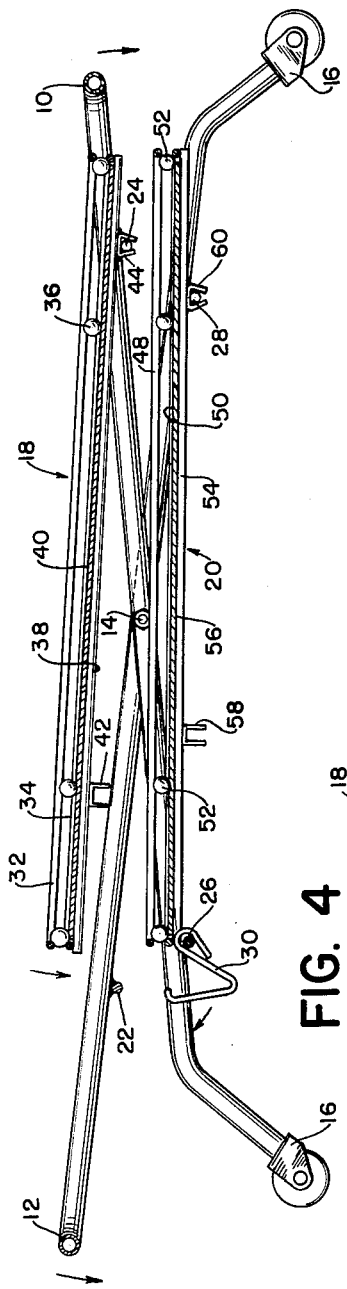
FIGURE 3 is a vertical central longitudinal cross-sectional view through the assembly comprising the cart in folded but unlocked position.
Figure 5:
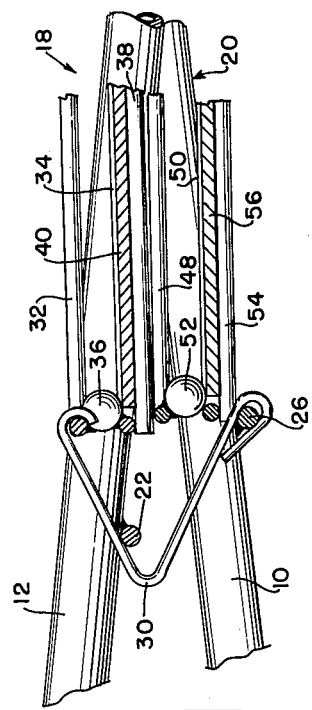
FIGURE 5 is an enlarged detail sectional view showing the final disposition of the parts when the cart is completely collapsed and locked in collapsed position.

The cart can be opened up from the collapsed position shown in FIGURES 3 and 5 by raising the main frames 10 and 12 to a position where the clips 40 and 42 can nest upon the cross bracing rods 22 and 26 assuming the relationship shown in FIGURE 2. The cart is then fully open and ready for use.

In order to collapse the cart the clips 42 and 58 are disengaged from their associated cross brace rods by raising the related ends of the table frames whereupon the main frame members 10 and 12 swing downwardly to the approximate position shown in FIGURE 3. The parts are then pressed together until the locking hook 30 can be swung around the rod 22 on the rod 26 to the point where its grooved end fits over the table frame member 32 as shown in FIGURE 5. The cart is then completely collapsed into its flattest position and is already for storage.

Since the embodiment of the invention illustrated in the attached drawing and described in detail herein is only one example of the novel structure and combination herein disclosed, it is intended that the scope of protection afforded hereby be determined by the appended claim.

I claim:

A serving cart assembly of the type described, comprising a pair of U-shaped frame members pivotally connected together intermediate their ends, pairs of cross braces interconnecting the legs of said frame members on two levels, table members releasably interconnecting said cross braces and holding said main frame members in operative form, said table members being each pivotally mounted on a related pair of cross braces and detachably engaging the remaining pair to hold the main frame members open and support said tables in parallel spaced relation and a locking member pivotally mounted on one of said cross braces at the lower level and engaging the detachable end of the upper table member when the said table members are detached from said remaining pair of cross braces and the assembly is in collapsed position to lock the assembly in collapsed position.

References Cited by the Examiner

UNITED STATES PATENTS

| | | | |
|---|---|---|---|
| 907,423 | 12/08 | Tilley | 108—27 X |
| 2,005,566 | 6/35 | Schwabe | 108—111 |
| 2,019,877 | 11/35 | Thomas | 211—181 |
| 2,215,131 | 9/40 | Page | 108—120 |
| 2,254,770 | 9/41 | Bitney | 211—181 |
| 2,310,326 | 2/43 | Swartwout | 211—181 |
| 2,831,599 | 4/58 | Graffeo | 220—19 |
| 2,832,499 | 4/58 | Maslow | 220—19 |
| 2,923,428 | 2/60 | Averill | 220—19 |
| 3,017,034 | 1/62 | Klein | 108—119 |
| 3,099,356 | 7/63 | Burnett | 108—111 |

FOREIGN PATENTS

| | | |
|---|---|---|
| 37,856 | 2/09 | Austria. |
| 893,090 | 1/44 | France. |
| 1,191,370 | 4/59 | France. |
| 621,258 | 4/49 | Great Britain. |

FRANK B. SHERRY, *Primary Examiner.*